(12) United States Patent
Rydh

(10) Patent No.: US 10,899,036 B2
(45) Date of Patent: Jan. 26, 2021

(54) MACHINE AND METHOD FOR FLUID JET CUTTING

(71) Applicant: Water Jet Sweden AB, Ronneby (SE)

(72) Inventor: Tony Rydh, Ronneby (SE)

(73) Assignee: Water Jet Sweden AB, Ronneby (SE)

( * ) Notice: Subject to any disclaimer, the term of this patent is extended or adjusted under 35 U.S.C. 154(b) by 25 days.

(21) Appl. No.: 16/330,350

(22) PCT Filed: Sep. 5, 2017

(86) PCT No.: PCT/SE2017/050877
§ 371 (c)(1),
(2) Date: Mar. 4, 2019

(87) PCT Pub. No.: WO2018/048339
PCT Pub. Date: Mar. 15, 2018

(65) Prior Publication Data
US 2019/0217494 A1    Jul. 18, 2019

(30) Foreign Application Priority Data
Sep. 7, 2016 (EP) .................................... 16187625

(51) Int. Cl.
| B26F 1/38 | (2006.01) |
|---|---|
| B26F 3/00 | (2006.01) |
| B24C 1/04 | (2006.01) |
| B24C 7/00 | (2006.01) |
| B26D 5/00 | (2006.01) |

(52) U.S. Cl.
CPC ............ B26F 1/3813 (2013.01); B24C 1/045 (2013.01); B24C 7/0015 (2013.01); B26D 5/00 (2013.01);
(Continued)

(58) Field of Classification Search
CPC ........ B26F 1/3813; B26F 3/004; B24C 1/045; B24C 7/0015; B26D 5/00; G05B 2219/45036
See application file for complete search history.

(56) References Cited

U.S. PATENT DOCUMENTS 4,335,636 A * 6/1982 Porter .................... B26D 1/605
                                                        83/177
5,372,540 A    12/1994 Burch et al.
(Continued)

FOREIGN PATENT DOCUMENTS

EP    2584419 A2    4/2013
JP    H06304898 A    11/1994

OTHER PUBLICATIONS

International Search Report and Written Opinion for PCT Application No. PCT/SE2017/050877, dated Nov. 10, 2017 in 9 pages.

*Primary Examiner* — Omar Flores Sanchez
(74) *Attorney, Agent, or Firm* — Knobbe, Martens, Olson & Bear LLP

(57) ABSTRACT

The invention relates to a machine (1) for fluid jet cutting of a workpiece (2), comprising a stand (4) with two essentially parallel guides (6, 8) at a distance from each other. A control unit (15) is configured to control the motion of the bar, the bar (14) carries one or more fluid jet cutting tools (16A-D). Each end of the bar are arranged to the guides via a first journal means (18A) and a second journal means (20A). The machine comprises a workpiece position measuring equipment (22x', 22x", 22x''') for sensing at least two reference positions (x', x", x''') of the workpiece (2), and the control unit (15) is configured to operate the motion of the bar (14) from the reference position values (x', x", x''') and other operational data. The invention also relates to a method for fluid jet cutting of a workpiece. The invention also relates to a computer program at a machine for fluid jet cutting of a
(Continued)

workpiece. The invention also relates to a computer program product at a machine for fluid jet cutting of a workpiece.

8 Claims, 3 Drawing Sheets

(52) U.S. Cl.
CPC .... *B26F 3/004* (2013.01); *G05B 2219/45036* (2013.01)

(56) References Cited

U.S. PATENT DOCUMENTS

| | | | |
|---|---|---|---|
| 5,746,566 A * | 5/1998 | Pfarr | B26F 1/3806 414/744.5 |
| 5,877,960 A | 3/1999 | Gross et al. | |
| 6,155,245 A * | 12/2000 | Zanzuri | B24C 1/045 125/1 |
| 7,121,918 B2 * | 10/2006 | Marti | B24C 1/045 451/2 |
| 10,549,446 B2 * | 2/2020 | Dereims | B23Q 1/527 |
| 2006/0112801 A1 * | 6/2006 | Ganci | B26D 5/20 83/39 |
| 2009/0084235 A1 | 4/2009 | Kata et al. | |
| 2012/0330449 A1 * | 12/2012 | Edwards | B26D 5/00 700/97 |
| 2013/0025422 A1 | 1/2013 | Chillman et al. | |
| 2014/0352514 A1 * | 12/2014 | Broeker | B26F 1/3813 83/522.26 |
| 2016/0311069 A1 * | 10/2016 | Deiss | B23K 26/0876 |
| 2016/0311079 A1 * | 10/2016 | Leseur | B24C 1/045 |
| 2017/0106475 A1 * | 4/2017 | Mikkelsen | B26D 7/018 |
| 2017/0305027 A1 * | 10/2017 | Broeker | B26F 1/3806 |
| 2018/0001507 A1 * | 1/2018 | Dereims | B26F 3/004 |

* cited by examiner

MACHINE AND METHOD FOR FLUID JET CUTTING

CROSS-REFERENCE TO RELATED APPLICATIONS

This application is the U.S. National Phase under 35. U.S.C. § 371 of International Application PCT/SE2017/050877, filed Sep. 5, 2017, which claims priority to European Patent Application No. 16187625.5, filed Sep. 7, 2016. The disclosures of the above-described applications are hereby incorporated by reference in their entirety.

BACKGROUND AND PRIOR ART

The invention relates to a machine for fluid jet cutting of a workpiece according to the preamble of patent claim 1. The invention also relates to a method for fluid jet cutting of a workpiece according to the preamble of patent claim 5. The invention also relates to a computer program at a machine for fluid jet cutting of a workpiece, according to the preamble of patent claim 7. The invention also relates to a computer program product at a machine for fluid jet cutting of a workpiece, according to the preamble of patent claim 8.

A machine of this kind is also referred to as a coordinate machine and its function is to move a load in at least two mutually opposite directions.

The principle on which such a machine is based is that a movable carrying axle or bar must be supported at both ends. Machines of this kind are suitable for water jet cutting of workpieces. The workpiece to be cut is placed on the bed of the machine table above a water filled catch tank. During operation, one or more water jet tools arranged on the bar cuts or process the underlying workpiece while the axle or bar is moved in the longitudinal direction of the machine. Waste water and debris is gathered in the below tank positioned within frame sides of the machine.

The machines are required to work with great precision. Very high tolerance requirements are placed on those machine elements that together form a stable, fixed unit, with respect to the parallelism between frame sides and axle or bar attachment means. It will be realized that production costs are therewith necessarily high. The carrying axle or bar with its parts supported at both ends must be driven synchronously on respective opposite sides in order to achieve optimal synchronization of axle or bar movement. Because high precision requirements result in high costs, this represents a problem.

The document EP 0842009 B1 discloses a coordinate machine where one end of a bar is provided with a first journal means which permits limited pivoting of the bar, while the opposite end of the bar is provided with a second journal means which permits the bar to pivot and to move horizontally. The design greatly reduces the tolerance requirements on bar with its parts supported at both ends. The design also obviates the earlier required parallelism of the movement paths between frame sides and bar attachment means. In addition, the design also greatly reduces the need to synchronize the two drives, by virtue of enabling the bar to be positioned obliquely without risk of the machine malfunctioning.

SUMMARY OF THE INVENTION

A further problem is the positioning of the workpiece to be treated in the machine, which can be time-consuming and troublesome. The workpiece has to be accurately aligned with respect to the coordinate system of the machine, with respect to the X-axle represented by the bar and the Y-axle represented by the longitudinal extension of the frame sides of the machine. Some workpieces can be very large and heavy, such as sheet steel, making it impossible to move the workpieces without assistance by heavy lifting tools. Once the workpiece is accurately aligned and fixed in position, the workpiece cannot be moved during the machining operation. The machines often comprise multi-tool equipped bars. It is not possible to align an individual tool on the bar in the coordinate system.

Yet a further problem is that the machine must be calibrated often, especially the carrying axle or bar with its parts supported at both ends to the frame sides, due to the very high tolerance requirements. Variations in the temperature during machining influence the dimensions of the machine parts. For instance, during water jet cutting of the workpiece, the temperature of the water in the catch tank increases, which among other things result in a dimension increase of the bar that becomes twisted and thus a change in the working position of the tools on the bar relative the underlying workpiece.

EP 0842009 B1 does not discuss the problem with respect to the handling and accurate alignment of the workpiece relatively the tool equipped bar of the machine. Further, nothing is disclosed about compensation or calibration needed due to inter alia temperature variations during machining.

Despite prior art, there is a need to develop a machine for fluid jet cutting of a workpiece having a movable carrying axle or bar supported at both ends comprising at least one tool for processing an underlying workpiece, which reduces production costs, reduces the high and accurate requirements of alignment of the workpiece relatively one or more fluid jet cutting tools on the axle or bar, and which reduces the need for machine downtime or lengthy interruption in the operation of the machine for necessary calibration. It is also a need to develop a method for operation of such a machine.

The object of the invention is thus to provide a machine for fluid jet cutting of a workpiece of the type defined in the introduction, which reduces production costs, reduces the high and accurate requirements of alignment of the workpiece relatively one or more fluid jet cutting tools on the axle or bar, and which reduces the need for machine downtime or lengthy interruption in the operation of the machine for necessary calibration.

These objectives are achieved with a machine for fluid jet cutting of a workpiece, which is characterized by the features specified in patent claim 1, comprising a stand with two essentially parallel guides at a distance from each other. The respective opposing parallel guides are configured to carry movingly each end of a bar which can move essentially in the longitudinal direction of the stand. A control unit is configured to control the motion of the bar. The bar carries one or more fluid jet cutting tools. Each ends of the bar are arranged to the guides via a first journal means and a second journal means. One end of the bar coacts with a first journal means which at least enables the bar to pivot to a limited extent. The other end of the bar coacts with a second journal means which at least enables the bar to move horizontally and pivotally. The machine is characterized in that it further comprises a workpiece position measuring equipment for sensing at least two reference positions of the workpiece. The control unit is configured to operate the motion of the bar from the reference position values and other operational data.

According to the invention, an advantageously machine for fluid jet cutting of a workpiece is achieved, which reduces production costs, reduces the high and accurate requirements of alignment of the workpiece relatively a tool on the axle or bar, and which reduces the need for machine downtime or lengthy interruption in the operation of the machine for necessary calibration. Since the workpiece position can be detected, it is possible to accurately adjust the position of the tool equipped bar of the machine in alignment with the workpiece to be machined. As a result, also compensation and/or calibration required due to volume changes of the bar, resulting from temperature variations during machining, can be achieved effectively.

According to an embodiment of the invention an electronically controlled lock is in engagement with at least one of the first journal means and a second journal means. The electronically controlled lock is so configured that it can lock and release at least one of the first journal means and a second journal means, resulting in locking respectively releasing the bar in position for pivotal and horizontal movement. With such a configuration of the machine, it is possible to continuously adjust the tool equipped bar in alignment with the workpiece during an ongoing processing of a workpiece. Hence, it makes it possible to reduce the need for machine downtime or lengthy interruption in the operation of the machine for necessary calibration.

According to another embodiment of the invention the machine is provided with a first sensor unit that is arranged to the at least one of the first journal means and a second journal means. The effect is that the pivotal and/or horizontal position of the bar can be sensed whereby positon data can be provided to the machine control system such that the tools on the bar may compensate for any position changes of the bar during ongoing processing or when a new work is prepared in the machine for fluid jet cutting.

According to still another embodiment of the invention the bar comprises a second sensor unit. As a result, the position of an underlying workpiece can be sensed during movement of the bar essentially in the longitudinal direction of the stand. Thus, positon data of the workpiece can be provided to the machine control system such that the tools on the bar may compensate for any position changes of the workpiece during ongoing processing, preferably continuously.

These objectives are also achieved with a method for fluid jet cutting of a workpiece, which is characterized by the features specified in patent claim 5, where a machine comprises a stand with two essentially parallel guides at a distance from each other. The respective opposing parallel guides are configured to carry movingly each end of a bar which can move essentially in the longitudinal direction of the stand. A control unit is configured to control the motion of the bar. The bar carries one or more fluid jet cutting tools. Each end of the bar is arranged to the guides via a first journal means and a second journal means. One end of the bar coacts with a first journal means which at least enables the bar to pivot to a limited extent and the other end of the bar coacts with a second journal means which at least enables the bar to move horizontally and pivotally. The method comprises the following steps: sensing at least two reference positions of the workpiece position with a workpiece position measuring equipment; calculating the position of the workpiece based on the reference position values; and operating and adjusting the position of the bar relatively the position of the workpiece from the reference position values and other operational data provided by the control unit.

According to the invention, an advantageously method for fluid jet cutting of a workpiece is achieved, which reduces production costs, reduces the high and accurate requirements of alignment of the workpiece relatively a tool on the axle or bar, and which reduces the need for machine downtime or lengthy interruption in the operation of the machine for necessary calibration. Since the workpiece position can be detected, it is possible to accurately adjust the position of the tool equipped bar of the machine in alignment with the workpiece to be machined. As a result, also compensation and/or calibration required due to volume changes of the bar, resulting from temperature variations during machining, can be achieved effectively.

According to an embodiment of the invention, the method may further comprise the steps of: detecting two edge points, situated along one side of the workpiece, where the two edge points are provided as the two reference positions of the workpiece position; and calculating the position of the workpiece comprises calculating the angle between the two reference positions relatively the longitudinal direction of the stand. Thus, by detecting two edge points, it is possible to very accurately adjust the position of the tool equipped bar of the machine in alignment with the workpiece to be machined.

These objectives are also achieved with a computer program at a machine for fluid jet cutting of a workpiece, which is characterized by the features specified in patent claim 7, where the machine comprises a stand with two essentially parallel guides at a distance from each other. The respective opposing parallel guides are configured to carry movingly each end of a bar which can move essentially in the longitudinal direction of the stand. An electronic control unit is configured to control the motion of the bar. The bar carries one or more fluid jet cutting tools, each end of the bar are arranged to the guides via a first journal means and a second journal means. One end of the bar coacts with a first journal means which at least enables the bar to pivot to a limited extent and the other end of the bar coacts with a second journal means which at least enables the bar to move horizontally and pivotally. Said computer program (P) comprises program code stored on a medium that is readable on a computer, for causing the electronic control unit or other computer connected to the electronic control unit to perform the steps: sensing at least two reference positions of the workpiece position with a workpiece position measuring equipment; calculating the position of the workpiece based on the reference position values; and operating and adjusting the position of the bar relatively the position of the workpiece from the reference position values and other operational data provided by the control unit.

These objectives are also achieved with a computer program product at a machine for fluid jet cutting of a workpiece, which is characterized by the features specified in patent claim 8, where the machine comprises a stand with two essentially parallel guides at a distance from each other. The respective opposing parallel guides are configured to carry movingly each end of a bar which can move essentially in the longitudinal direction of the stand. An electronic control unit is configured to control the motion of the bar, the bar carries one or more fluid jet cutting tools, each end of the bar are arranged to the guides via a first journal means and a second journal means. One end of the bar coacts with a first journal means which at least enables the bar to pivot to a limited extent and the other end of the bar coacts with a second journal means which at least enables the bar to move horizontally and pivotally. Further comprising a program code stored on a medium that is readable on a computer, for performing the steps: sensing at least two reference positions of the workpiece position with a workpiece position measuring equipment; calculating the position of the workpiece based on the reference position values; and operating and adjusting the position of the bar relatively the position of the workpiece from the reference position values and other operational data provided by the electronic control unit; when said computer program is run on the electronic control unit or other computer connected to the electronic control unit.

The machine and the method are preferably configured for water jet cutting.

BRIEF DESCRIPTION OF THE DRAWINGS

Below is a description of, as examples, preferred embodiments of the invention with reference to the enclosed drawings, in which.

DETAILED DESCRIPTION OF PREFERRED EMBODIMENTS OF THE INVENTION

Figure 1:
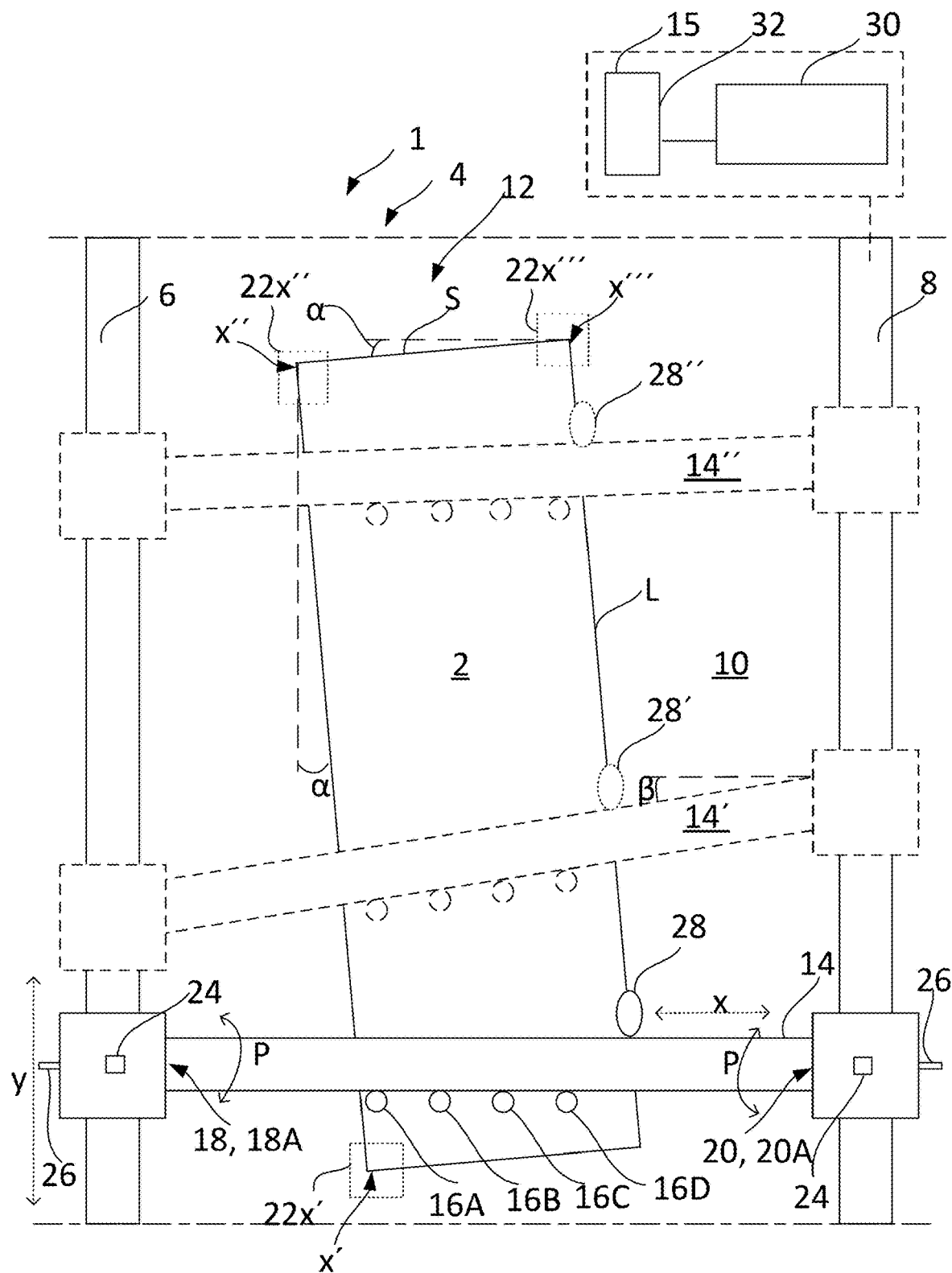
FIG. 1 shows schematically a machine for fluid jet cutting of a workpiece in a view from above, according to a first embodiment to the invention.

FIG. 1 shows a machine 1 for fluid jet cutting of a workpiece 2 in a first embodiment to the invention, comprising a stand 4 with two essentially parallel guides 6, 8, extending in a longitudinal direction Y, at a distance from each other. The workpiece 2 to be cut is placed on a bed 10 of the machine table, between the parallel guides 6, 8 within the frame sides of the machine, above a water filled catch tank 12. The respective opposing parallel guides 6, 8 are configured to carry movingly each end of a bar 14. A control unit 15 is configured to control the motion of the bar 14. The bar 14 extends in an essentially transverse direction X relative the parallel guides 6, 8 and carries one or more fluid jet cutting tools 16A-16D. Such a machine is also called coordinate machine, since the transverse bar 14 and the guides parallel 6, 8 forms an X-Y coordinate system.

For a multi tool equipped machine an individual tool 16A, 16B, 16C, 16D, cannot be pivoted in the coordinate system X-Y, but only be turned and rotated around its own axle. A bar may have many tools, even as many as ten or more tools. The bar 14 is configured to move essentially in the longitudinal direction of the stand.

Each ends 18, 20 of the bar 14 are arranged to the guides 6, 8 via a first journal means 18A and a second journal means 20A. One end 18 of the bar 14 coacts with a first journal means 18A which at least enables the bar 14 to pivot P to a limited extent. The other end 20 of the bar 14 coacts with a second journal means 20A which at least enables the bar 14 to move horizontally X and pivotally P. With respect to design of the first and second journal means (18A, 20A), reference is made to EP 0842009 B1, which discloses such a configuration. It is possible that the design of the first journal means 18A is configured as the second journal means 20A, such that it also enables the bar 14 to move horizontally X and pivotally P. The design of the journal means 18A, 20A may also have other configuration as long as the journal means at one end at least enables the bar 14 to pivot P to a limited extent, while the other end at least enables the bar 14 to move horizontally X and pivotally P.

The machine further comprises a workpiece position measuring equipment $22x'$, $22x''$, $22x'''$ for detecting at least two reference positions $x'$, $x''$, $x'''$ of the workpiece 2. The control unit 15 is configured to operate the motion of the bar 14 from the reference position values $x'$, $x''$, $x\propto''$ and other operational data.

Other operational data may comprises fluid pressure data and/or abrasive medium data and/or fluid jet cutting head data and/or fluid jet cutting focusing tube data and/or surface finish requirement data and/or geometric entity data and/or workpiece material quality data and/or workpiece thickness.

According to an alternative, an operator may initiate and monitor operation of said workpiece position according to the inventive method by means of a computer (not shown) and suitable user interface. Said computer is signal connected to the control unit 15.

As illustrated in FIG. 1, the reference positions $x'$, $x''$, $x'''$ of the workpiece 2 are sensed and collected from the edge corners of the workpiece 2. However, it is also possible to collect other reference positions of the workpiece 2, such as two or more reference positions at a distance from each other along the same long side L or short side S of the workpiece 2. As a result from the collection of reference positions $x'$, $x''$, $x'''$ the deviation angle α of the workpiece 2 relative the bar can be calculated, whereby the position of the bar 14 can be adjusted such that it follows the workpiece position as desired. As shown in the embodiment in FIG. 1, the bar has been adjusted to a new position 14', with an adjusting angle β, such that the bar 14 follows the workpiece substantially transverse to the long side L, or substantially parallel to the short side S, of the workpiece 2.

The workpiece position measuring equipment $22x'$, $22x''$, $22x'''$ may be a sensor such as an ultrasonic sensor, for measuring the position of the workpiece 2. The workpiece position measuring equipment $22x'$, $22x''$, $22x'''$ can suitably be arranged on a framework or a beam (not shown), above the bar 14.

According to an embodiment, an electronically controlled lock 24 is suitably in engagement with at least one of the first journal 18A means and a second journal means 20A for locking respectively releasing the bar 14 in position for pivotal P and horizontal X movement.

According to yet an embodiment, a first sensor unit 26 is suitably arranged to the at least one of the first journal means 18A and a second journal means 20A, for sensing the pivotal P and/or horizontal X position of the bar 14.

According to a further embodiment, the bar 14 suitably comprises a second sensor unit 28 configured to sense/register the position of an underlying workpiece 2 during the movement of the bar 14, 14', 14'' essentially in the longitudinal direction Y of the stand.

It is possible according to an embodiment that the actuation of the first journal means and a second journal means, to move the bar horizontally and pivotally, can be configured to be carried out continuously during the movement of the bar essentially in the longitudinal direction of the stand.

The collected data of the reference position $x'$, $x''$, $x'''$ serves as a starting parameter and is fed to the control unit 15. The control unit 15 thereafter executes and operates the motion of the bar 14 for cutting the workpiece 2 and may comprise a CNC controller 30. The value of reference position $x'$, $x''$, $x'''$ may in this example be determined from the workpiece 2 characteristic and other operational data, such as geometric entity, type of material of the workpiece, quality of the material of the workpiece, thickness of the material of the workpiece, etc. The control unit 15 is coupled to a human-machine interface 32 (e.g. touchscreen interface) and comprises a CAD/CAM Software configured for input/data collection. The CAD/CAM Software is configured to execute input parameters such as the above-mentioned operational data. The control unit 15 and the CAD/CAM Software thus provides a complete software-controlled, machine 1 for fluid jet cutting permitting the flexibility to adjust the bar over the whole length of the workpiece 2. The control unit 15 is configured to initiate one or more functions of the machine 1 for fluid jet cutting, such as starting, stopping, reversing and automatically changing positon of the bar 14 from a pre-set list of commands.

Figure 2:
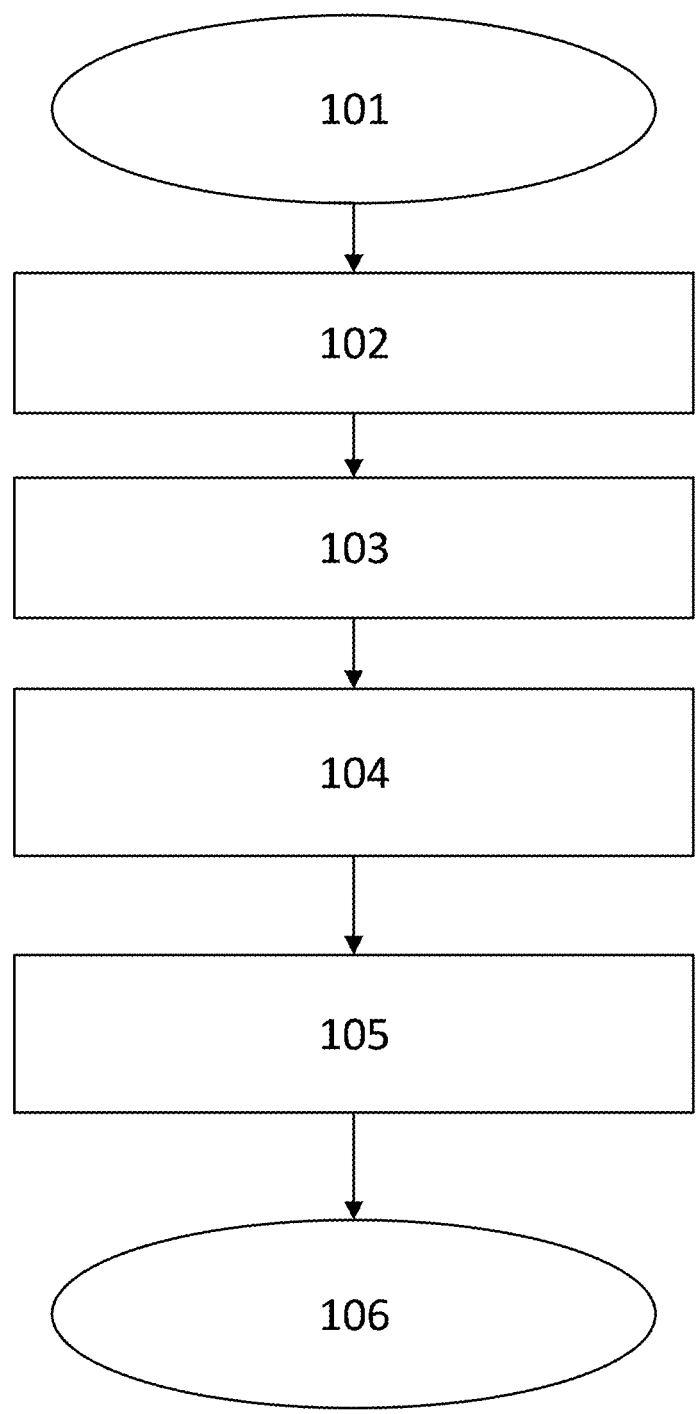
FIG. 2 shows an exemplary flowchart of a method for fluid jet cutting of a workpiece according to a second embodiment to the invention.

FIG. 2 shows an exemplary flowchart of a method for fluid jet cutting of a workpiece 2 according to a second embodiment to the invention, where a machine 1 comprises a stand 4 with two essentially parallel guides 6, 8 at a distance from each other, as described with reference to FIG. 1. The respective opposing parallel guides 6, 8 are configured to carry movingly each end of a bar 14 which can move essentially in the longitudinal direction Y of the stand. A control unit 15 is configured to control the motion of the bar 14. The bar carries one or more fluid jet cutting tools 16A-D. Each end of the bar is arranged to the guides via a first journal means 18A and a second journal means 20A. One end 18 of the bar 14 coacts with a first journal means 18A which at least enables the bar 14 to pivot P to a limited extent and the other end 20 of the bar 14 coacts with a second journal means 20A which at least enables the bar 14 to move horizontally X and pivotally P.

The method shown in FIG. 2 illustrates a first step 101 comprising the start of the method. A second step 102 illustrates a method for sensing at least two reference positions of the workpiece position with a workpiece position measuring equipment; A third step 103 illustrates calculating the position of the workpiece based on the reference position values; A forth step 104 illustrates operating and adjusting the position of the bar relatively the position of the workpiece from the reference position values and other operational data provided by the control unit. Step 105 shows the step of cutting the work piece is performed in accordance with moving a support bar. In Step 106 the method is fulfilled and stopped.

The second step 102 may comprise the steps of detecting two edge points, situated along one side of the workpiece, where the two edge points are provided as the two reference positions of the workpiece position; The third step 103 may comprise the steps of calculating the position of the workpiece comprises calculating the angle between the two reference positions relatively the longitudinal direction of the stand.

Figure 3:
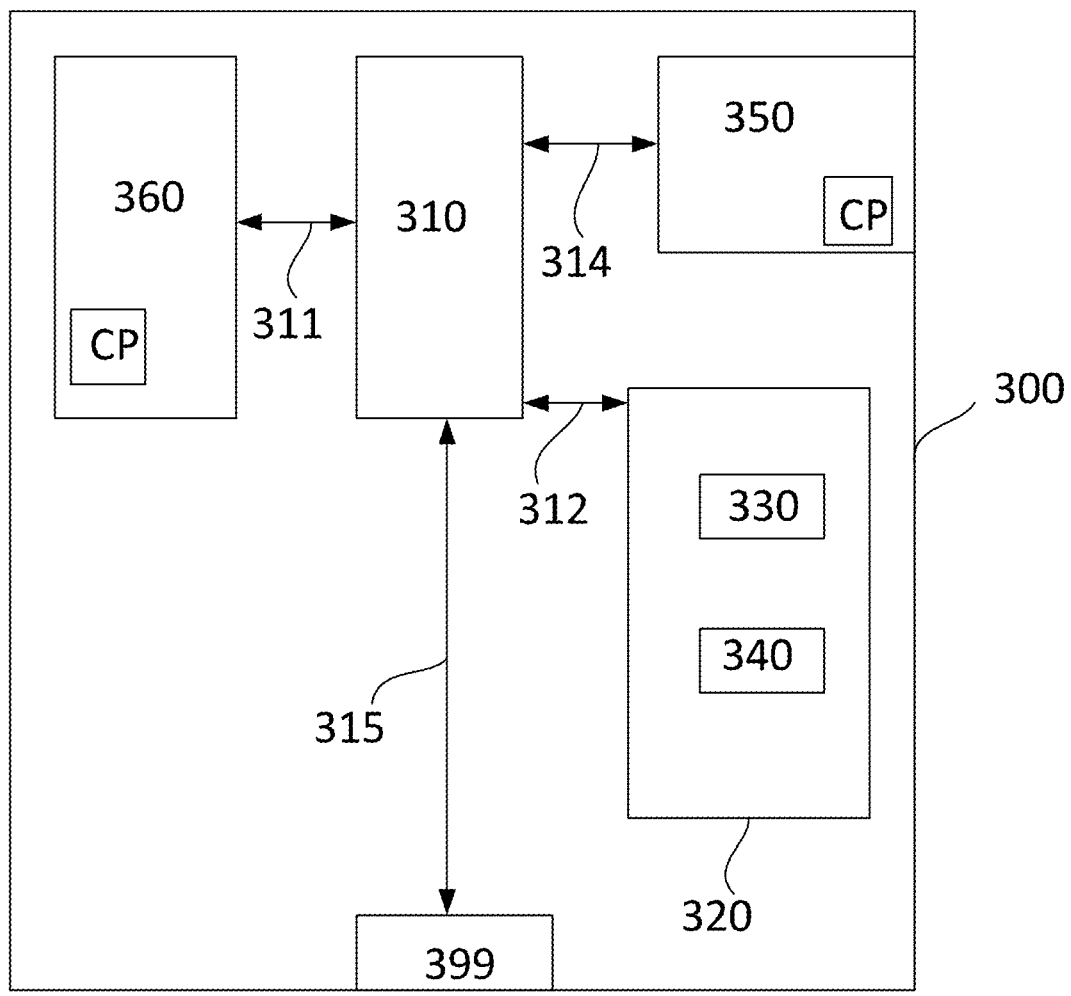
FIG. 3 illustrates a control unit according to different examples of the invention.

FIG. 3 illustrates a CPU device 300 according to different embodiments. The CPU device 300 may be formed in a control unit 15 of a machine for fluid jet cutting. The control unit 15 is configured to control the motion of a bar of the machine for fluid jet cutting relative a workpiece to be cut. The control unit 15 comprises the CPU device 300 of a computer. The CPU device 300 comprises a non-volatile memory NVM 320, which is a computer memory that can retain stored information even when the computer is not powered. The CPU device 300 further comprises a processing unit 310 and a read/write memory 350. The NVM 320 comprises a first memory unit 330. A computer program (which can be of any type suitable for any operational data) is stored in the first memory unit 330 for controlling the functionality of the CPU device 300. Furthermore, the CPU device 300 comprises a bus controller (not shown), a serial communication left (not shown) providing a physical interface, through which information transfers separately in two directions. The CPU device 300 may comprise any suitable type of I/O module (not shown) providing input/output signal transfer, an A/D converter (not shown) for converting continuously varying signals from detectors (not shown) of the machine for fluid jet cutting and from other monitoring units (not shown), positioned within the machine for fluid jet cutting in suitable positions, into binary code suitable for the computer.

The CPU device 300 also comprises an input/output unit (not shown) for adaptation to time and date. The CPU device 300 also comprises an event counter (not shown) for counting the number of event multiples that occur from independent events in operation of the fluid actuator arrangement. Furthermore, the CPU device 300 includes interrupt units (not shown) associated with the computer for providing a multi-tasking performance and real time computing for automatically operating and adjusting the position of the bar relatively the position of the workpiece from the reference position values and other operational data provided by the control unit.

The NVM 320 also includes a second memory unit 340 for external controlled operation. A data medium storing program P may comprise routines for automatically operating and adjusting the position of the bar relatively the position of the workpiece from the reference position values and other operational data provided by the control unit and is provided for operating the CPU device 300 for performing the method.

The data medium storing program CP comprises a program code stored on a medium, which is readable on the computer, for causing the electronic control unit 15 or other computer connected to the electronic control unit to perform the method at a fluid jet cutting of a workpiece. The machine comprises a stand 4 with two essentially parallel guides 6, 8 at a distance from each other. The respective opposing parallel guides are configured to carry movingly each end of a bar 14 which can move essentially in the longitudinal direction Y of the stand. A control unit 15 is configured to control the motion of the bar. The bar 14 carries one or more fluid jet cutting tools 16A-D. Each end of the bar are arranged to the guides via a first journal means 18A and a second journal means 20A. One end 18 of the bar 14 coacts with a first journal means 18A which at least enables the bar 14 to pivot to a limited extent and the other end 20 of the bar 14 coacts with a second journal means 20A which at least enables the bar 14 to move horizontally X and pivotally P. The method comprise the steps: sensing 102 at least two reference positions x', x", x''' of the workpiece position with a workpiece position measuring equipment 22x', 22x", 22x''', calculating 103 the position of the workpiece 2 based on the reference position values x', x", x''', and operating and adjusting 104 the position of the bar 14 relatively the position of the workpiece 2 from the reference position values x', x", x''' and other operational data provided by the control unit 15.

The data medium storing program CP further may be stored in a separate memory 360 and/or in the read/write memory 350. The data medium storing program P, in this embodiment, is stored in executable or compressed data format.

It is to be understood that when the processing unit 310 is described to execute a specific function that involves the processing unit 310 may execute a certain part of the program stored in the separate memory 360 or a certain part of the program stored in the read/write memory 350.

The processing unit 310 is associated with a data port 399 for communication via a first data bus 315. The non-volatile memory NVM 320 is adapted for communication with the processing unit 310 via a second data bus 312. The separate memory 360 is adapted for communication with the processing unit 310 via a third data bus 311. The read/write memory 350 is adapted to communicate with the processing unit 310 via a fourth data bus 314. The data port 399 is preferably connectable to data links of the machine for fluid jet cutting. When data is received by the data port 399, the data will be stored temporary in the second memory unit 340. After that the received data is temporary stored, the processing unit 310 will be ready to execute the program code, according to the above-mentioned method. Preferably, the signals (received by the data port 399) comprise information about operational status of the machine for fluid jet cutting, such as operational status regarding the position of the bar, the position of the fluid jet cutting head, the position of the fluid jet cutting head relative the workpiece to be cut. The signals may also comprise information about e.g. operational data regarding fluid pressure data and/or abrasive medium data and/or fluid jet cutting head data and/or fluid jet cutting focusing tube data and/or surface finish requirement data and/or geometric entity data and/or workpiece material quality data and/or workpiece thickness.

According to one aspect, signals received by the data port 399 may contain information about actual positions of the bar by means of sensor members. The received signals at the data port 399 can be used by the CPU device 300 for controlling and monitoring of the automatically adaptation of the bar in accordance with the reference position values.

The signals received by the data port 399 can be used for automatically moving the bar between two end positions. The signals can be used for different operations of the bar. The information is preferably measured by means of suitable sensor members of the machine for fluid jet cutting. The information can also be manually fed to the control unit via a suitable communication device, such as a computer display or touchscreen.

The method can also partially be executed by the CPU device 300 by means of the processing unit 310, which processing unit 310 runs the data medium storing program P being stored in the separate memory 360 or the read/write memory 350. When the CPU device 300 runs the data medium storing program CP, suitable method steps disclosed herein will be executed. A data medium storing program product comprising a program code stored on a medium is also provided, which product is readable on the computer, for performing the method steps of: sensing at least two reference positions of the workpiece position with a workpiece position measuring equipment; calculating the position of the workpiece based on the reference position values; and operating and adjusting the position of the bar relatively the position of the workpiece from the reference position values and other operational data provided by the electronic control unit; when said computer program is run on the electronic control unit or other computer connected to the electronic control unit.

The components and features specified above may within the framework of the invention be combined between the different embodiments specified.

What is claimed is:

1. A machine for fluid jet cutting of a workpiece, comprising:
   a stand,
   two essentially parallel guides, the respective opposing parallel guides being configured to carry movingly each end of a bar which is configured to move in the longitudinal direction of the stand,
   a workpiece position measuring equipment for sensing at least two reference positions of the workpiece, and
   a control unit configured to control the motion of the bar, wherein:
   the bar carries one or more fluid jet cutting tools,
   each end of the bar are arranged to the guides via a first journal and a second journal, whereby one end of the bar coacts with the first journal which at least enables the bar to pivot to a limited extent and the other end of the bar coacts with the second journal which at least enables the bar to move horizontally and pivotally, and
   the control unit is configured to operate the motion of the bar from the at least two reference positions and to provide operational parameters.

2. The machine for fluid jet cutting of a workpiece according to claim 1, wherein an electronically controlled lock is in engagement with at least one of the first journal and the second journal for locking respectively releasing the bar in position for pivotal and horizontal movement.

3. The machine for fluid jet cutting of a workpiece according to claim 1, wherein a first sensor unit is arranged to the at least one of the first journal and a second journal, for sensing the pivotal and/or horizontal position of the bar.

4. The machine for fluid jet cutting of a workpiece according to claim 1, wherein the bar comprises a second sensor unit configured to sense the position of an underlying workpiece during the movement of the bar essentially in the longitudinal direction of the stand.

5. A method for fluid jet cutting of a workpiece using a machine comprises a stand with two essentially parallel guides, the respective opposing parallel guides are configured to carry movingly each end of a bar which is configured to move in the longitudinal direction of the stand, a control unit is configured to control the motion of the bar, the bar carries one or more fluid jet cutting tools, each end of the bar are arranged to the guides via a first journal and a second journal, whereby one end of the bar coacts with a first journal which at least enables the bar to pivot to a limited extent and the other end of the bar coacts with a second journal which at least enables the bar to move horizontally and pivotally, the method comprising the following steps:
   sensing at least two reference positions of the workpiece position with a workpiece position measuring equipment;
   calculating the position of the workpiece based on the reference position values; and
   operating and adjusting the position of the bar relatively the position of the workpiece from the reference position values and operational parameters provided by the control unit.

6. The method according to claim 5, further comprising that the step of:
   detecting two edge points, situated along one side of the workpiece, where the two edge points are provided as the two reference positions of the workpiece position; and
   calculating the position of the workpiece comprises calculating the angle between the two reference positions relatively the longitudinal direction of the stand.

7. A non-transitory computer readable medium having a program stored thereon for executing a computer for a machine for fluid jet cutting of a workpiece, where the machine comprises a stand with two essentially parallel guides, the respective opposing parallel guides are configured to carry movingly each end of a bar which is configured to move in the longitudinal direction of the stand, an electronic control unit is configured to control the motion of the bar, the bar carries one or more fluid jet cutting tools, each end of the bar are arranged to the guides via a first journal and a second journal whereby one end of the bar coacts with a first journal which at least enables the bar to pivot to a limited extent and the other end of the bar coacts with a second journal which at least enables the bar to move horizontally and pivotally, to cause the electronic control unit or other computer connected to the electronic control unit to perform the steps:

sensing at least two reference positions of the workpiece position with a workpiece position measuring equipment;

calculating the position of the workpiece based on the reference position values; and operating and adjusting the position of the bar relatively the position of the workpiece from the reference position values and operational parameters provided by the control unit.

8. A computer program product for a machine for fluid jet cutting of a workpiece, where the machine comprises a stand with two essentially parallel guides, the respective opposing parallel guides are configured to carry movingly each end of a bar which is configured to move in the longitudinal direction of the stand, an electronic control unit is configured to control the motion of the bar, the bar carries one or more fluid jet cutting tools, each end of the bar are arranged to the guides via a first journal and a second journal, whereby one end of the bar coacts with a first journal which at least enables the bar to pivot to a limited extent and the other end of the bar coacts with a second journal which at least enables the bar to move horizontally and pivotally, comprising a program code stored on a medium that is readable on a computer, for performing the steps:

sensing at least two reference positions of the workpiece position with a workpiece position measuring equipment;

calculating the position of the workpiece based on the reference position values; and operating and adjusting the position of the bar relatively the position of the workpiece from the reference position values and operational parameters provided by the electronic control unit; when said computer program is run on the electronic control unit or other computer connected to the electronic control unit.

* * * * *